United States Patent [19]

Sundberg

[11] Patent Number: 5,345,620
[45] Date of Patent: Sep. 13, 1994

[54] COMPOSTING TOILET

[76] Inventor: Henric Sundberg, 5035 N. Service Rd., Unit C9, Burlington, Ontario, Canada, L7L 5V2

[21] Appl. No.: 37,756

[22] Filed: Mar. 26, 1993

[51] Int. Cl.$^5$ ............................................. A47K 11/02
[52] U.S. Cl. .................................. 4/449; 4/111.5; 4/DIG. 12; 366/187; 366/228; 435/312
[58] Field of Search ............... 4/111.1, 111.5, 111.6, 4/449, DIG. 12, DIG. 19; 366/57, 187, 225, 228; 422/184, 209; 435/312; 34/108, 109

[56] References Cited

U.S. PATENT DOCUMENTS

| | | | |
|---|---|---|---|
| 885,813 | 4/1908 | Warner | 366/187 X |
| 930,319 | 8/1909 | Short | 4/DIG. 12 |
| 3,676,074 | 7/1972 | Shibayama et al. | 435/312 X |
| 3,845,939 | 11/1974 | Waldenville | 435/312 X |
| 3,859,672 | 1/1975 | Modig | 4/DIG. 12 |
| 3,890,129 | 6/1975 | Chester | 435/312 X |
| 3,921,228 | 11/1975 | Sundberg | 4/DIG. 12 |
| 4,633,535 | 1/1987 | Louvo | 4/449 |
| 4,933,073 | 6/1990 | Jonkers et al. | 34/109 X |
| 5,104,232 | 4/1992 | Lennox, III | 366/187 X |
| 5,171,690 | 12/1992 | Ylosjoki | 4/DIG. 12 |

FOREIGN PATENT DOCUMENTS 2494715  5/1982  France .................. 435/312
1226786  9/1989  Japan ..................... 435/312

Primary Examiner—Robert M. Fetsuga

[57] ABSTRACT

A composting toilet comprising a housing having a seat disposed about an opening communicating with an aeration drum for receiving human waste matter. The drum is rotatably-mounted for rotation about a longitudinal axis oriented horizontally inside the housing. A removable receptacle adapted to receive decomposed solid waste matter from the aeration drum for periodic removal from the toilet is also provided. The aeration drum has a narrow front end for receiving and discharging waste, and a wide rear end extending radially outwardly from the front end. The rear end has liquid outlets in fluid communication with the housing and a gas outlet is disposed opposite the liquid outlets to cause an airflow through the composting solid waste and for venting any gases which enter the aeration drum or are formed through decomposition inside the drum. The configuration of the drum with the wide rear end is designed to collect gases in the rear end away from the seat area, provides increased capacity at the rear of the toilet so as to allow the seat which is at the front of the toilet to be lower and more conveniently accessible by a user, and defines a rear bottom surface which is always lower than at the front of the drum thereby improving the separation of liquid waste from solid waste.

7 Claims, 4 Drawing Sheets

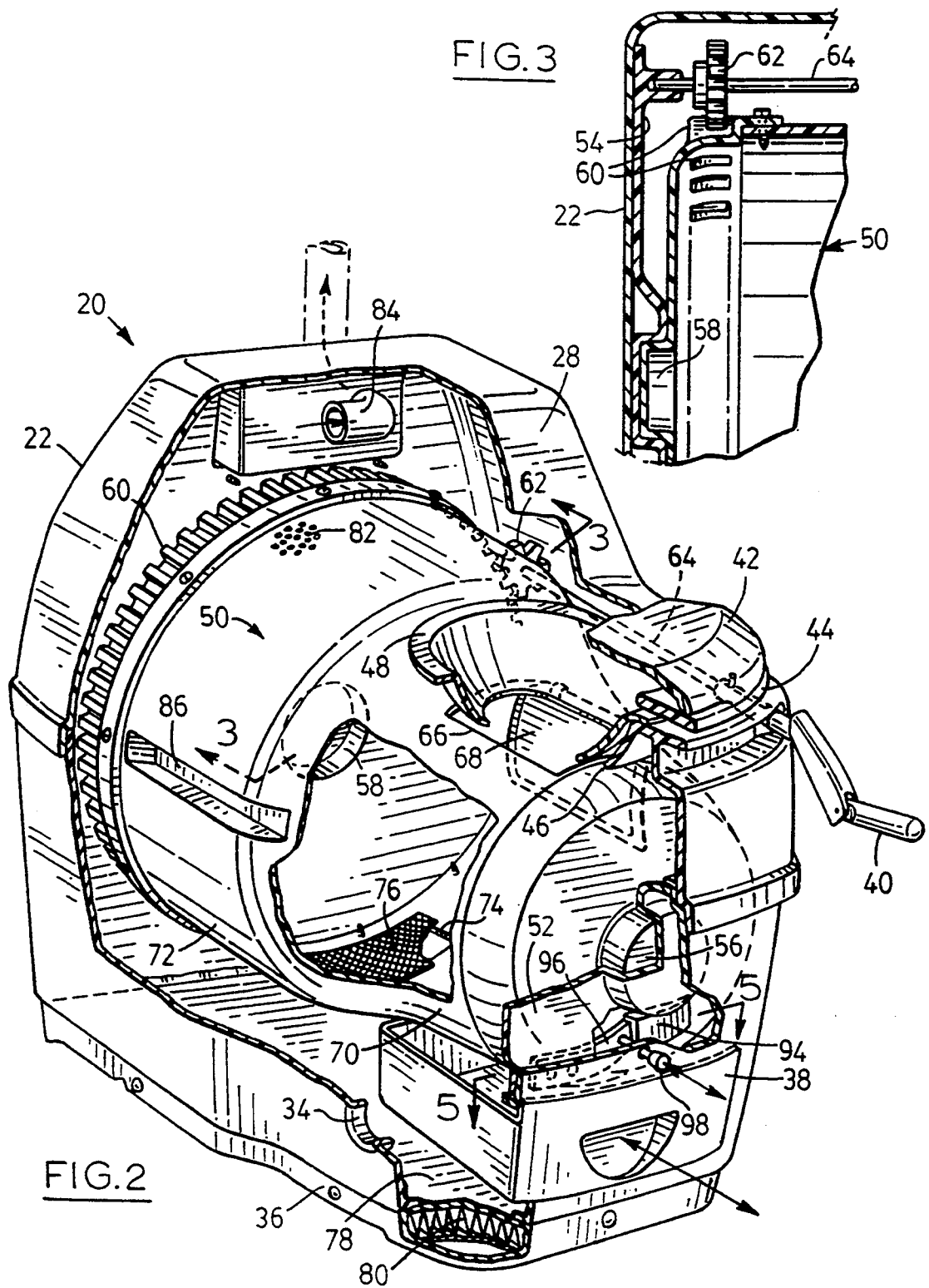

COMPOSTING TOILET

FIELD OF THE INVENTION

This invention relates to composting toilets. In particular, the invention is directed to improvements to an aeration drum used in composting toilets for aeration of the decomposing waste and mixing the waste with added organic matter.

BACKGROUND TO THE INVENTION

Composting toilets use the natural processes of decomposition and evaporation to recycle human waste. The toilets do not require any septic systems, holding tanks, or chemicals, and can be installed easily in remote locations, isolated areas like islands and rocky sites without fear of contaminating the environment. In order for the toilets to transform human waste into good fertilizing soil, the liquid waste is separated from the solid waste and, optionally, heated to supplement the heat generated during decomposition of the solid waste so that it will evaporate. The solid waste is aerated and supplemented with organic material which conveniently will comprise peat moss or kitchen scraps.

In order that a composting toilet will operate without any offensive odours, it is important to provide a good liquid drain and to flow fresh air through the toilet so as to vent the toilet and to entrain water vapour originating in the waste entering the toilet. A fresh supply of oxygen also assists in a fast, odourless, aerobic breakdown of the solid material to transform it into an inoffensive earth-like substance.

Modern composting toilets include an aeration drum to provide superior aeration and mixing of the waste material. In order to provide sufficient capacity for average residential or cottage use, aeration drums are typically constructed from cylinders having a diameter of 18 inches and disposed horizontally for rotation about their longitudinal axis. Normally a toilet seat and bowl are disposed above the aeration drum and a drawer is provided beneath the drum for the periodic removal of decomposed solid waste matter. The aggregate height of the drawer, drum, and toilet bowl and seat result in a unit where the distance separating the seat from the floor far exceeds a comfortable height for seating an average person.

An object of this invention is to provide means to improve venting in a composting toilet so as to further minimize the opportunity for any noxious odours to escape from the toilet and to provide a more convenient and cosmetically-appealing unit.

Another object of the invention is to improve the separation of liquid waste from solid waste.

SUMMARY OF THE INVENTION

In accordance with this invention, there is provided an aeration drum adapted to receive human waste matter. The drum is rotatably-mounted for rotation about a longitudinal axis inside a housing and has a narrow front end and a wide rear end extending radially outwardly from the front end. The rear end has liquid discharge means in fluid communication with the housing. A gas outlet means is disposed opposite the liquid discharge means for venting any gases which enter the aeration drum or are formed through decomposition inside the drum.

The configuration of the drum with the wide rear end is adapted to collect and drain liquid away from the narrow front end and also provides increased capacity at the rear of the toilet so as to allow a seat at the front of the toilet to be lower and more conveniently accessible by a user.

BRIEF DESCRIPTION OF THE DRAWINGS

A preferred embodiment of the invention will now be described with reference to the following drawings, in which:

FIG. 2 is a similar view to FIG. 1, partly broken away to reveal the component parts of the composting toilet;

FIG. 3 is a partly sectioned view taken on line 3—3 of FIG. 2 showing the association between an aeration drum and a housing for the toilet at a rear end thereof;

DESCRIPTION OF THE INVENTION WITH REFERENCE TO THE DRAWINGS

Figure 1:
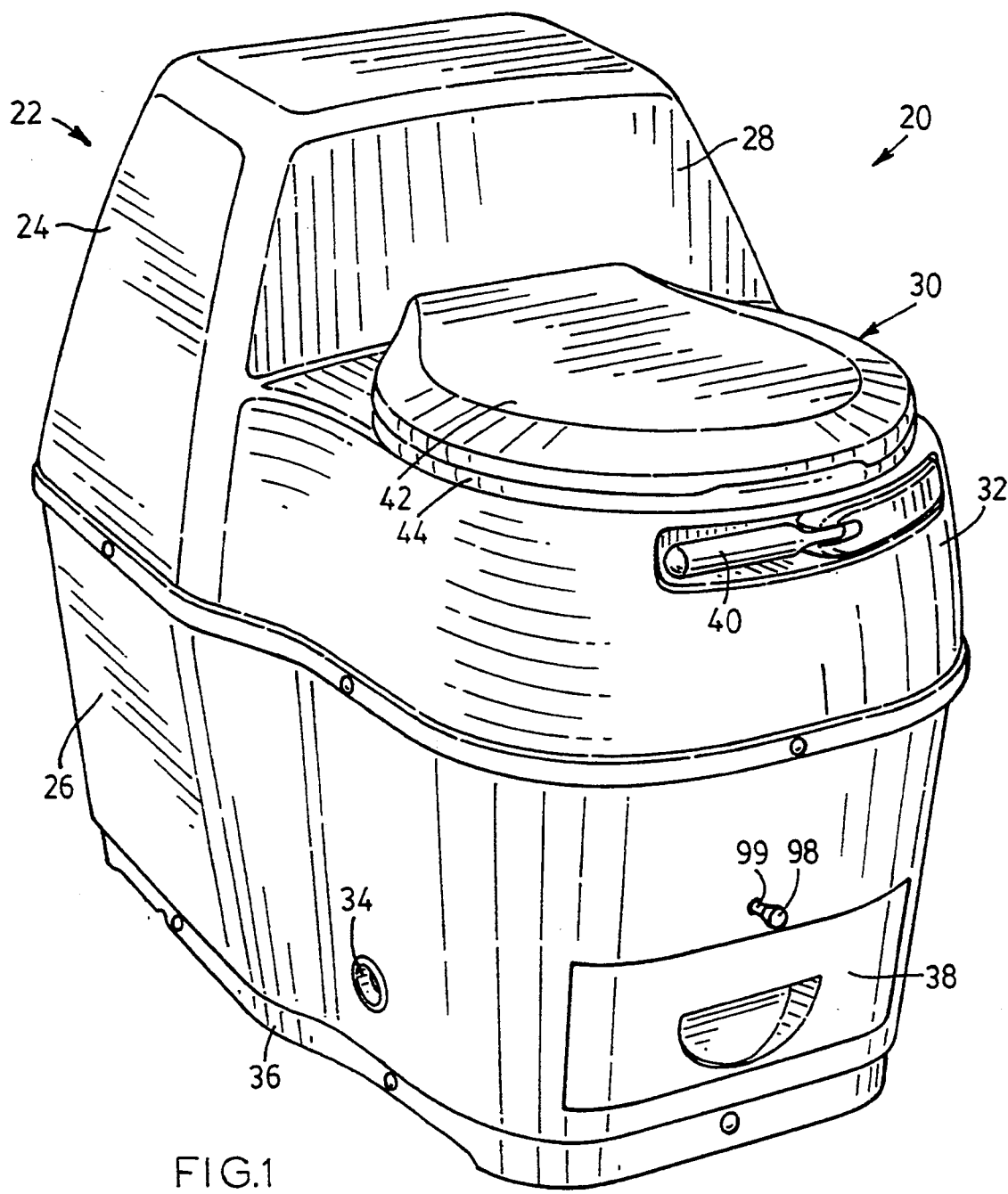
FIG. 1 is a perspective view from the front showing a composting toilet in accordance with the invention.

A composting toilet made in accordance with the invention is generally indicated by Numeral (20) in FIG. 1. A housing (22) comprising an upper portion (24) fitted to a lower portion (26) and made from fibreglass material conceal most of the operating components from view. It will be appreciated that the upper portion of the housing has an upwardly-extending rear portion (28) disposed behind a seat portion (30) and extending above the seat portion in conventional fashion. Furthermore, the seat portion (30) is disposed on a front portion (32) of the housing which is narrower in width than the rear portion (28) so that the composting toilet resembles a conventional flush toilet having a unitary body.

Other features of the composting toilet (20) apparent from FIG. 1 include an aeration hole (34) formed in a side wall of the housing (22) at the front of the toilet (20) and upwardly spaced from a floor (36) comprising the housing (22). The front face of a drawer (38) accessible from the front of the toilet (20) and upwardly spaced from the floor (36) can also be seen in FIG. 1. Finally, FIG. 1 shows a handle (40) which is shown disposed in its stored configuration inside a recess provided in a front face of the upper portion of the housing adjacent the seat portion (30).

The component parts of the composting toilet (20) will now be described with reference to FIG. 2. It will be seen that the seat portion (30) comprises a lid (42) hinged to a seat (44) and disposed about an opening (46) in the housing which is lined with a bowl (48).

An aeration drum (50) extends longitudinally between the front and rear portions of the housing (22) which are lined with respective inner wall portions (52), (54) (FIG. 3). The inner wall portions (52), (54) are shaped to receive and support a front boss (56) and a rear boss (58) extending outwardly from the drum (50) about the longitudinal axis of the drum and rotatably coupled to the associated inner wall portions (52), (54). The rear portion of the drum (50) has a cogged circumference (60) engaged by a pinion wheel (62) disposed to one side of the housing and mounted on a shaft (64) rotatably mounted between the back wall lining (54) of the housing (22) and the front of the housing where it terminates in the handle (40).

Figure 9:
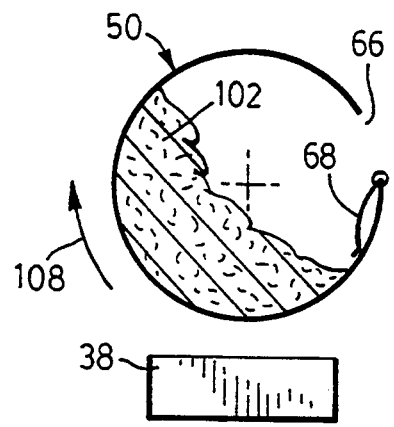
FIG. 9 is a similar view to FIG. 7, with the aeration drum rotated approximately 120 degrees clockwise from the position in FIG. 6.

Waste access means are defined in the aeration drum (50) by an opening (66) associated with a door (68) hinged to the drum (50) for suspension inside the drum. As will become apparent from FIGS. 7, 9 and 10, the door (68) is adapted to close the opening (66) when the drum is rotated in one direction and to free the opening when rotated in the opposite direction. In the normal orientation as drawn in FIG. 2, the opening (66) will align with the bowl (48) so that human waste matter discharged into the toilet will be received in the drum (50).

It will be noted that the aeration drum has a narrow front end (70) and a wide rear end (72) which extends radially outwardly from the front end. The front end (70) accommodates the waste access means, the opening (66), and is disposed to lie above the drawer (38) into which relatively dry decomposing solid waste is periodically discharged and held for a period of two to three weeks prior to removal from the composting toilet.

The rear end (72) has an opening (74) diametrically opposite the waste access means (66) and covered with a mesh (76) of expanded stainless steel for the discharge of liquid matter from the drum (50) onto the floor (36) of the housing (22). The floor (36) has a false bottom (78) which conceals a heating element (80) that supplements heat generated during composting for the evaporation of liquid discharged through the mesh (76).

A plurality of perforations (82) in the aeration drum (50) define gas outlet means and are disposed opposite the mesh (76) on the same side of the drum longitudinal axis as the waste access means (66). The perforations (82) are adapted to cause an airflow through the composting solid waste and allow gases to escape from the drum (50) so as to be aspired into a vent pipe (84) arranged in the rear portion (28) of the housing (22) and disposed to vent gases to a location remote from the toilet (20). A pair of diametrically-opposed ribs or paddles (86) extend radially inwardly from the wall of the drum (50) along the length of the rear end (72) to assist in lifting solid waste matter during rotation of the drum.

Figure 4:
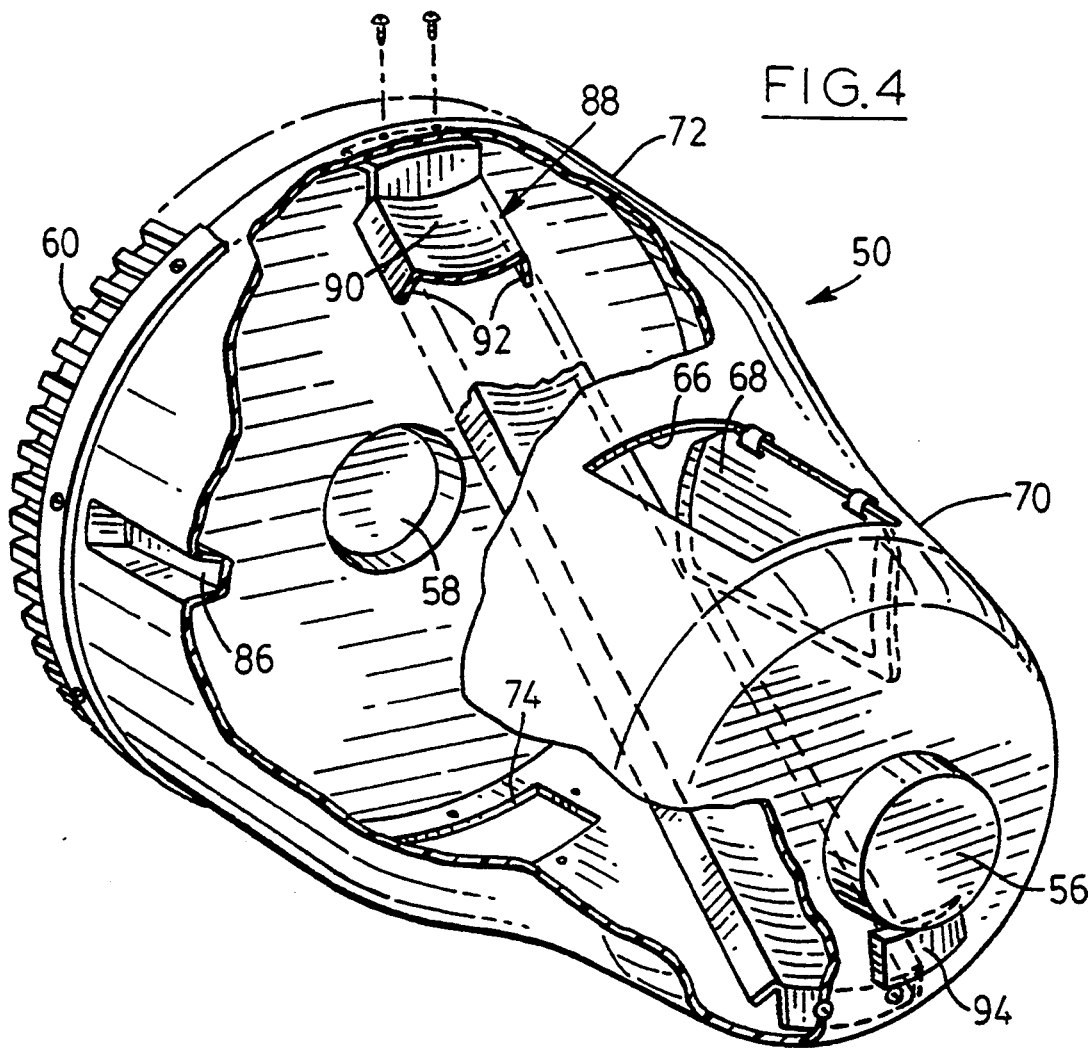
FIG. 4 is a partially broken-away perspective view of an aeration drum for a composting toilet in accordance with the invention.

To provide for still better mixing, the aeration drum (50) includes a chute (88) (FIG. 4) mounted at one end to the rear end of the drum (50) add at the other end to the front of the drum diametrically opposite to the rear-mounted end. The chute (88) has a concave surface (90) extending along the length thereof and a pair of retaining lips (92) disposed to extend outwardly from the opposite (convex) surface of the chute (88).

The aeration drum (50) also includes stop means in the form of a wedge (94) disposed on the front outside face of the drum so as to extend between the drum (50) and the housing (22). An interference means in the form of a flexible pawl (96) is mounted to the interior surface of the front wall lining (52) adjacent the housing (22) and is retractable away from the path of movement of the wedge (94) (FIG. 5) by means of a knob (98). The knob (98) is mounted to a stem (99) attached at one end to the pawl (96) and which penetrates the front wall lining (52) and the housing (22) so that the knob (98) is accessible from outside the toilet (20).

In use, any solid waste matter is supplemented with organic material conveniently provided in the form of peat moss or kitchen waste. Approximately 90% of the waste matter discharged into the toilet (20) through normal use is liquid which will drain away from the front end (70) of the aeration drum (50) towards the rear end (72) which, because of its greater radial width, has a bottom surface which is always disposed below the bottom surface of the front end (70) and therefore is adapted to improve the separation of liquid waste from the solid waste. The liquid is then discharged through the mesh (76) where it collects on the false bottom (78) of the floor (36) and is evaporated and vented outside the composting toilet by an airflow between the air inlet (34) and vent pipe (84). If desired, this flow may be augmented by means of a fan mounted adjacent the vent pipe (84) at the rear of the composting toilet (22).

Any water vapour inside the aeration drum (50) and other waste gases will collect in the rear end (72) above the height of the seat portion (30) so that they will not offend the user of the toilet. The perforations (82) provided at the rear end (72) will allow the collected gases to escape from the aeration drum (50) and be vented up the vent pipe (84).

Figure 7:
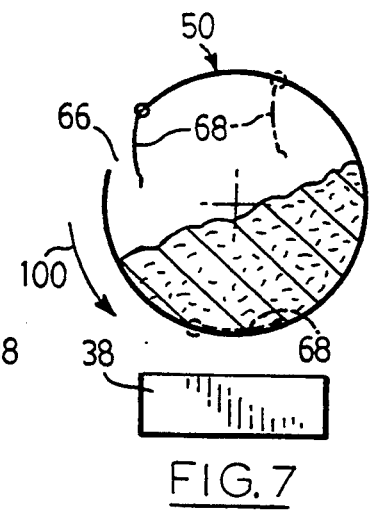
FIG. 7 is a cross-sectional view taken on line 7—7 of FIG. 6 with the aeration drum partially rotated in a counter-clockwise direction.

On a regular basis, the handle (40) is turned so as to rotate the aeration drum (50) in a counter-clockwise direction as indicated by arrow (100) in FIG. 7. The door (68) is mounted so that it will pivot to close the drum opening (66). Any solid waste matter (102) in the aeration drum (50) will tumble and be mixed. In practice, the aeration drum (50) will not be more than 50–60% full. During such rotation of the drum (50), it will be appreciated that the paddles or ribs (86) will operate to improve such mixing by lifting solid matter resting thereon (FIG. 8).

Figure 6:
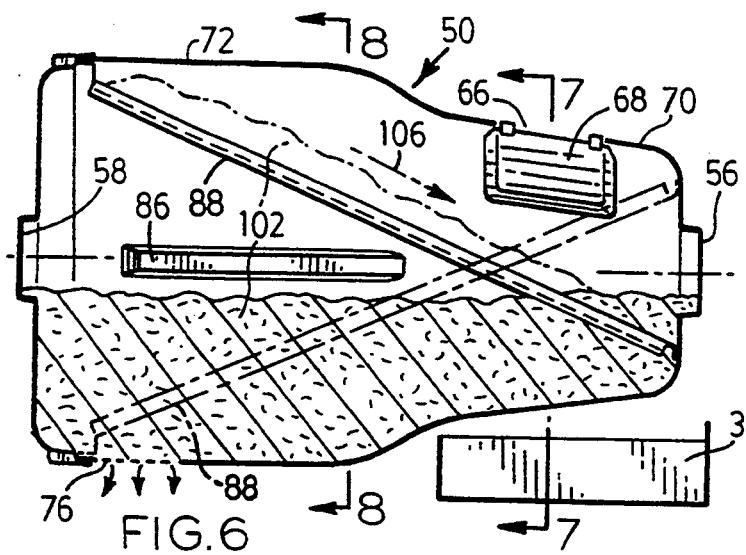
FIG. 6 is a schematic side elevation of the aeration drum of FIG. 4 and an associated drawer.
Figure 8:
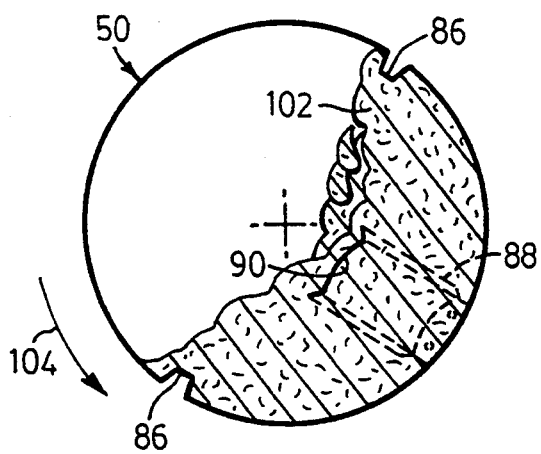
FIG. 8 is a cross-sectional view taken on line 8—8 of FIG. 6 with the aeration drum rotated approximately 240 degrees counter-clockwise.

Continued counter-clockwise rotation of the drum (50) as indicated by arrow (104) in FIG. 8 will bring the rearmost end of the chute (88) into the tumbling solid matter (102) and such matter will be retained on the concave surface (90) of the chute (88) as the drum (50) continues to rotate. Because the chute (88) is mounted so that its rear end is diametrically opposite its front end, any solid matter lying on the concave surface (90) will slide forwardly as indicated by arrow (106) in FIG. 6, thereby bringing forward decomposing material from the rear end of the drum (50).

The lips (92) extending from the opposite surface of the chute (88) likewise serve to contain solid waste matter on the chute at the front end thereof so that the chute operates to direct solid waste matter from the front of the drum (50) towards its centre thereby ensuring that no "dead pockets" of undisturbed matter will accumulate at the front of the drum (50).

Figure 5:
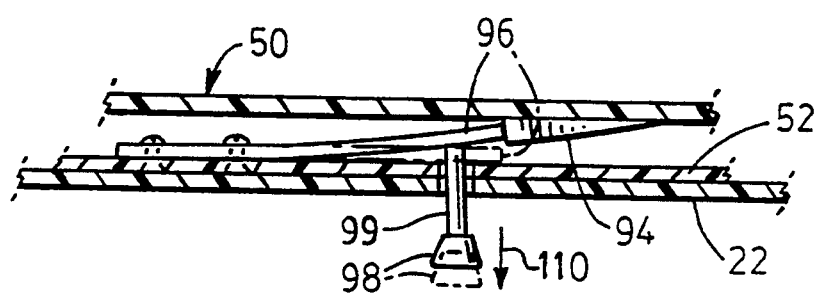
FIG. 5 is a cross-sectional view taken on line 5—5 of FIG. 2 showing stop means for arresting motion between the aeration drum and the housing of the composting toilet.

Referring now to FIG. 5, it will be seen that the stop (94) is engaged by the pawl (96) which operates to obstruct rotational movement of the drum in a clockwise direction in normal use. If it is desired to rotate the drum (50) in a clockwise direction as indicated by arrow (108) in FIG. 9, the pawl (96) is moved out of the path of movement by pulling on the knob (98) as indicated by arrow (110) so as to bring the pawl to the position shown in ghost outline in FIG. 5.

Figure 10:
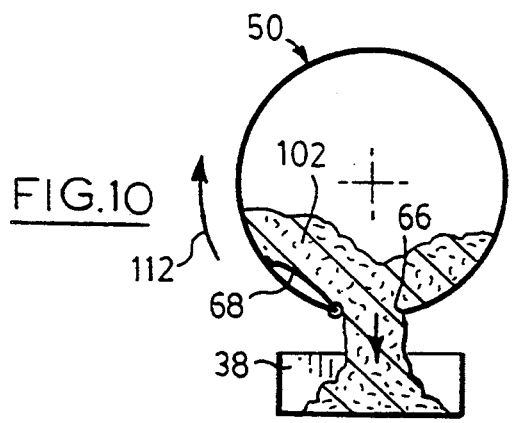
FIG. 10 is a similar view to FIG. 9 with the aeration drum rotated clockwise a further 100 degrees.

Continued clockwise rotation of the drum (50) as indicated by arrow (112) will cause the door (68) to the drum opening (66) to reside in an open configuration and will allow waste matter (102) to be discharged through the opening (66) into the collection drawer (38) (FIG. 10). The decomposing solid waste collected in the drawer (38) is held for a period of two to three weeks for final composting and may then be disposed of safely for garden use. Such removal of decomposed solid waste from the aeration drum (50) is required only infrequently, typically about every 2-3 months for a toilet serving a family of four on a day-to-day basis.

It will thus be appreciated that the pawl (96) and stop (94) arrangement shown in FIG. 5 operates to prevent the accidental discharge of waste matter into the drawer (38) resulting from inadvertent rotation of the drum in a clockwise direction.

Several variations may be made to the above-described embodiment of the invention within the scope of the appended claims. In particular, it will be noted that the aeration drum in accordance with the invention need not incorporate a chute of the kind identified by reference No. (88) in the above-mentioned description. Other obvious changes within expected skill would include the optional use of the heater element (80) which itself may take several configurations, and of an electric fan to augment airflow through the toilet unit. Many other expedients may also be used for rotatably mounting the aeration drum within the housing and such features have been described merely as exemplary features enabling those skilled in the art to make the invention claimed.

Finally, it will be appreciated that convenience and safety are very important commercial features of the invention. The elegant modifications to the shape of the aeration drum result in a compact unit which not only is cosmetically appealing, it is a unit which operates more efficiently to drain liquid or vent gases as the case may be without the addition of any moving parts which would require additional servicing and maintenance.

I claim:

1. In a composting toilet comprising a housing having a seat disposed about an opening communicating with an aeration drum for receiving human waste matter and rotatably mounted for rotation about a longitudinal axis thereof oriented horizontally inside the housing; air inlet and air outlet means in the housing for venting the toilet; and a removable receptacle adapted to receive decomposed solid waste matter from the aeration drum for periodic removal from the toilet, the improvement in which the aeration drum has a narrow front end with waste access means for receiving and discharging waste therefrom, and a wide rear end extending radially outwardly from said front end, liquid discharge means being disposed in said wide rear end in fluid communication with the housing and gas outlet means being disposed opposite said liquid discharge means, the gas outlet means and the said waste access means lying on the same side of said longitudinal axis so that any gases entering the aeration drum and formed therein will collect in said wide rear end of the drum and be vented through said gas outlet means, said configuration of the aeration drum providing increased capacity at the rear of the toilet and thereby allowing the seat disposed at the front of the toilet to be lowered for convenient access by a user.

2. Composting toilet according to claim 1 in which the aeration drum includes at least one pair of diametrically opposed paddles extending radially inwardly into the drum and along the length of said rear end to assist in lifting solid waste matter during rotation of the drum.

3. Composting toilet according to claim 1 in which the aeration drum includes a chute mounted at one end to the rear end of the drum and at another end to the front end of the drum diametrically opposite to said rear mounted end so that solid waste matter collected in the chute at the rear end of the drum will flow forwardly to the front end of the drum upon rotation of the drum.

4. Composting toilet according to claim 3 in which the chute has a concave surface extending along the length thereof and retaining lips disposed on the opposite surface of the chute so that solid waste matter at the front end of the drum will be mixed.

5. Composting toilet according to claim 1 having a heating element disposed in a floor for the housing to assist in the evaporation of liquid waste.

6. In a composting toilet comprising a housing having a seat disposed about an opening communicating with an aeration drum for receiving human waste matter and rotatably mounted for rotation about a longitudinal axis thereof oriented horizontally inside the housing; air inlet and air outlet means in the housing for venting the toilet; and a removable receptacle adapted to receive decomposed solid waste matter from the aeration drum for periodic removal from the toilet; the improvement in which the aeration drum includes a chute mounted at one end to a rear end of the drum and at another end to a front end of the drum diametrically opposite to said rear end of the drum so that solid waste matter collected in the chute at the rear end of the drum will flow forwardly to the front end of the drum upon rotation of the drum.

7. Composting toilet according to claim 6 in which the chute has a concave surface extending along the length thereof and retaining lips disposed on the opposite surface of the chute so that solid waste matter at the front end of the drum will be mixed.

* * * * *